United States Patent [19]

Perl

[11] E Re. 29,602

[45] Reissued Apr. 4, 1978

[54] DOMESTIC OVEN

[75] Inventor: Richard L. Perl, Mansfield, Ohio

[73] Assignee: The Tappan Company, Mansfield, Ohio

[21] Appl. No.: 82,707

[22] Filed: Oct. 21, 1970

Related U.S. Patent Documents

Reissue of:

[64] Patent No.: 3,417,742
Issued: Dec. 24, 1968
Appl. No.: 643,104
Filed: Jun. 2, 1967

[51] Int. Cl.[2] ..... F24C 15/32
[52] U.S. Cl. ..... 126/21 A
[58] Field of Search ..... 126/21 R, 21 A, 39 R, 126/39 C, 273 R

[56] References Cited

U.S. PATENT DOCUMENTS

| | | | |
|---|---|---|---|
| 1,224,497 | 5/1917 | O'Dowd | 126/21 X |
| 1,342,991 | 6/1920 | Erskine | 126/39 |
| 2,350,293 | 5/1940 | Stanchfield | 126/21 X |
| 3,169,871 | 2/1965 | Macchi et al. | 126/39 X |
| 3,255,746 | 6/1966 | Jenn et al. | 126/21 |

*Primary Examiner*—Edward G. Favors
*Attorney, Agent, or Firm*—Donnelly, Maky, Renner & Otto

[57] ABSTRACT

A domestic gas-fired oven having a top burner in the cooking cavity and a bottom burner fully concealed beneath the bottom of the cavity. The heated products of the bottom burner are caused to flow in a wrapper over the bottom and partially over the side walls to openings in the latter where these products enter the cavity. Air under pressure is supplied to the burners by a fan and another fan withdraws flue products from the top of the cavity, with the incoming air and the exhaust flowing through different sections of a rotating regenerator wheel for heat transfer therebetween. The burners can be operated separately for broiling and baking and together for high temperature self-cleaning of the oven.

9 Claims, 3 Drawing Figures

DOMESTIC OVEN

Matter enclosed in heavy brackets [ ] appears in the original patent but forms no part of this reissue specification; matter printed in italics indicates the additions made by reissue.

This invention relates to oven structure for household kitchen use and, more particularly, to an improved gas-fired oven having self-cleaning capacity.

It is a primary object of the invention to provide a single-cavity gas cooking oven having bake, broil and self-cleaning conditions of operation, with the interior surfaces of the oven in such cleaning being raised by a combination of radiant and convective heating effects to the relatively high temperature needed to effect decomposition of accumulated food soils thereon.

Another object is to provide such oven structure in which the cooking cavity is defined by a liner having a smooth, unobstructed and imperforate bottom, and at least two gas burners are used singly or in combination for the heating of the cavity.

It is also an object of the present invention to provide a domestic single-cavity oven having plural gas-fired heating devices to which combustion air is delivered under a pressure differential and under such regulation that the air can thus be delivered selectively to one or more of the devices.

A further object is to provide a multi-burner cooking oven in which room air is supplied under pressure to the burners and flue products are exhausted from the oven in heat exchange relationship to the inflow of the room or ambient air.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
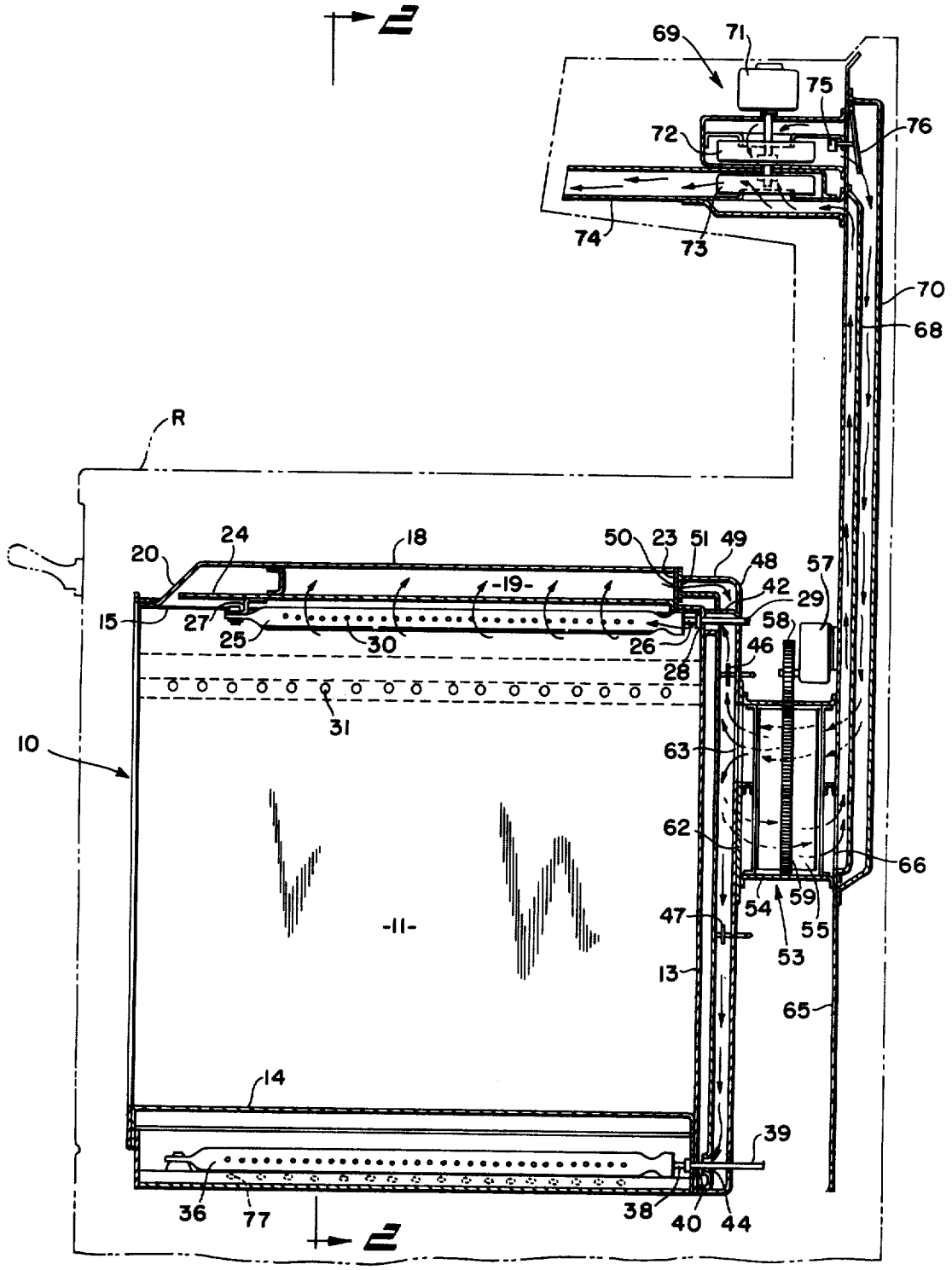
FIG. 1 is a sectional view of domestic oven structure in accordance with the present invention suitable for incorporation in a free-standing kitchen range shown in phantom outline.

Referring now to the drawings in detail, the dashed outline R will be recognized as depicting the form of a kitchen range cabinet and backguard and is intended only to represent a conventional exemplary environment for the oven structure which forms the present invention.

Such oven structure comprises a liner designated generally by reference numeral 10 which is approximately cubical and open at the front for access, with the front opening of course to be closed by suitable oven door. The liner thus forms opposed side walls 11 and 12, rear wall 13, and bottom wall 14, with the latter flat or smooth, imperforate, and preferably integral with the side walls as in a tub oven or one in which there is a continuous peripheral wrapper with rounded corners as illustrated. In the present construction, however, the top section of such wrapper has an opening 15 extending substantially the full depth of the oven and between the two upper curved corner portions 16, 17, and a relatively shallow housing 18 open at the bottom is applied to the wrapper to enclose such opening and form a plenum chamber 19. Such housing has a front wall 20 and side walls 21 and 22, respectively, which are inclined upwardly and inwardly from the corresponding margins of the wrapper opening 15, and a rear vertical wall 23. A baffle plate 24 extends from such chamber rear wall 23 horizontally forwardly substantially to the front wall 20 and is of such width as to extend from the longitudinal center of the chamber laterally more than half of the distance to the side wall at each side, with this baffle being approximately in the plane of the wrapper opening *and thereby forming a top oven liner wall.*

An elongated top burner 25 is disposed horizontally centrally beneath the baffle 24 in spaced relation, with its rear end supported on a gas spud 26 and its front end by suitable bracket 27, with the burner preferably being readily detached from such supports. The rear liner wall 13 has an opening 28 for a gas line 29 connection of the spud to an available source of gaseous fuel under pressure and, for a purpose to be described, this opening 28 is appreciably larger than the line 29 to provide clearance about the latter. The gas burner 25 which has been illustrated is of simple tubular form with two rows of ports 30 at the respective sides, and it will be appreciated that this device can be of any specific form appropriate for use as a top or broiler burner, including the various screen and other incandescent types which are essentially completely radiant heat generators.

The liner side wall 11 is provided with a plurality of apertures 31 arranged in a horizontal row at an intermediate elevation, shown in the illustrated embodiment as just below the contiguous curved upper corner portion 16, and the opposed side wall 12 is similarly provided with apertures 32. An outer wrapper 33 of channel form encloses the periphery of the liner 10 from an exterior line on the side wall 11 just above the apertures 31 about the bottom 14 to a corresponding line just above the other side wall apertures 32. Such wrapper is closed at its ends 34 and has a downwardly recessed removable bottom section 35 in which a second or bottom gas burner 36 also of elongated ported form is housed in spaced relation centrally beneath the liner bottom 14. This burner housing section 35 is preferably easily detached for convenient access to the burner for servicing and the like, and the burner is supported at its front end by a block 37 and at the rear on a further gas spud 38 having a fuel supply line 39. The wall which closes the rear of the burner housing section 35 has an opening 40 larger than the gas line 39 through which the latter extends, so that this arrangement is similar to that of the top burner in such respect.

Figure 2:
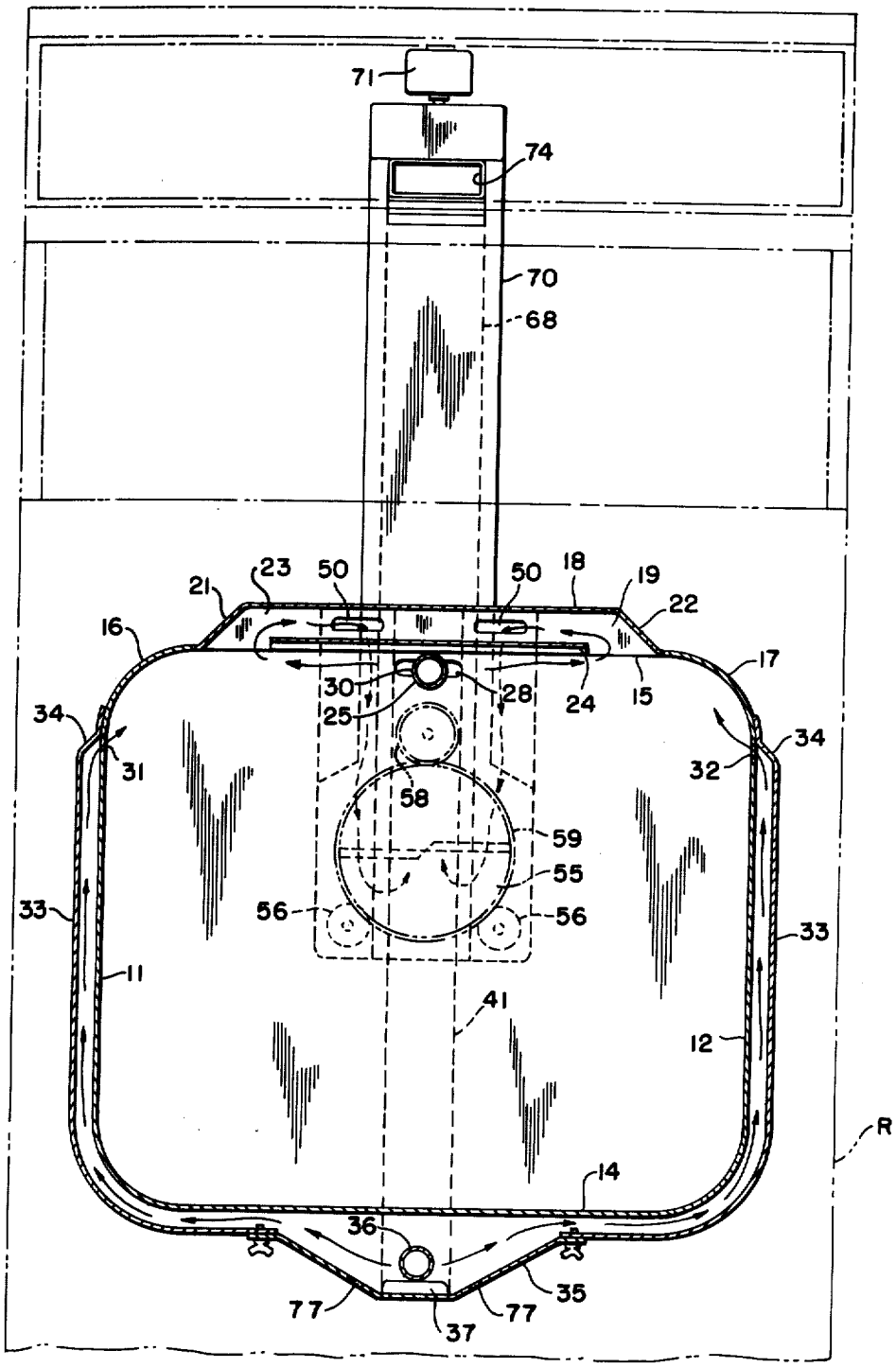
FIG. 2 is a transverse cross-section of such oven structure as viewed from the plane of the line 2—2 in FIG. 1.

*The outer wrapper or liner 33 defines with the box-like inner oven liner 10 a firebox encompassing the latter, with such firebox being of course structurally open at the front so as not to obscure access to the oven liner and the latter extending rearwardly and thereby behind the front opening. The flue gases from the burner 36 flow upwardly through the firebox around the opposite sides of the oven liner as shown by the arrows, most clearly in FIG. 2. Those*

*sections of the outer liner 33 opposed to the vertical side wall 11 and 12 of the inner liner form therewith flue channels surrounding such vertical walls, and the flue gases proceed across the top of the oven liner through the top plenum chamber or heating channel 19 to the rear, as also shown by the arrows in the drawings.*

An air supply duct 41 is arranged vertically behind the liner rear wall 13 and has a forwardly directed upper end section 42 having a discharge opening 43 and engaging the rear liner wall about the opening 28 in the latter behind the end of the top burner. A further discharge opening is provided in the lower end portion of the duct 41 in spaced register with the rear wall opening 40 behind the supply end of the bottom burner. The duct has an intermediate inlet opening 45, through which air under pressure is admitted in a manner which will be described, and contains two dampers 46 and 47 respectively above and below this inlet, with these dampers operable by suitable linkages or the like, not shown, for control of the air supply to the top and bottom burners as will also be more fully explained hereinbelow.

Figure 3:
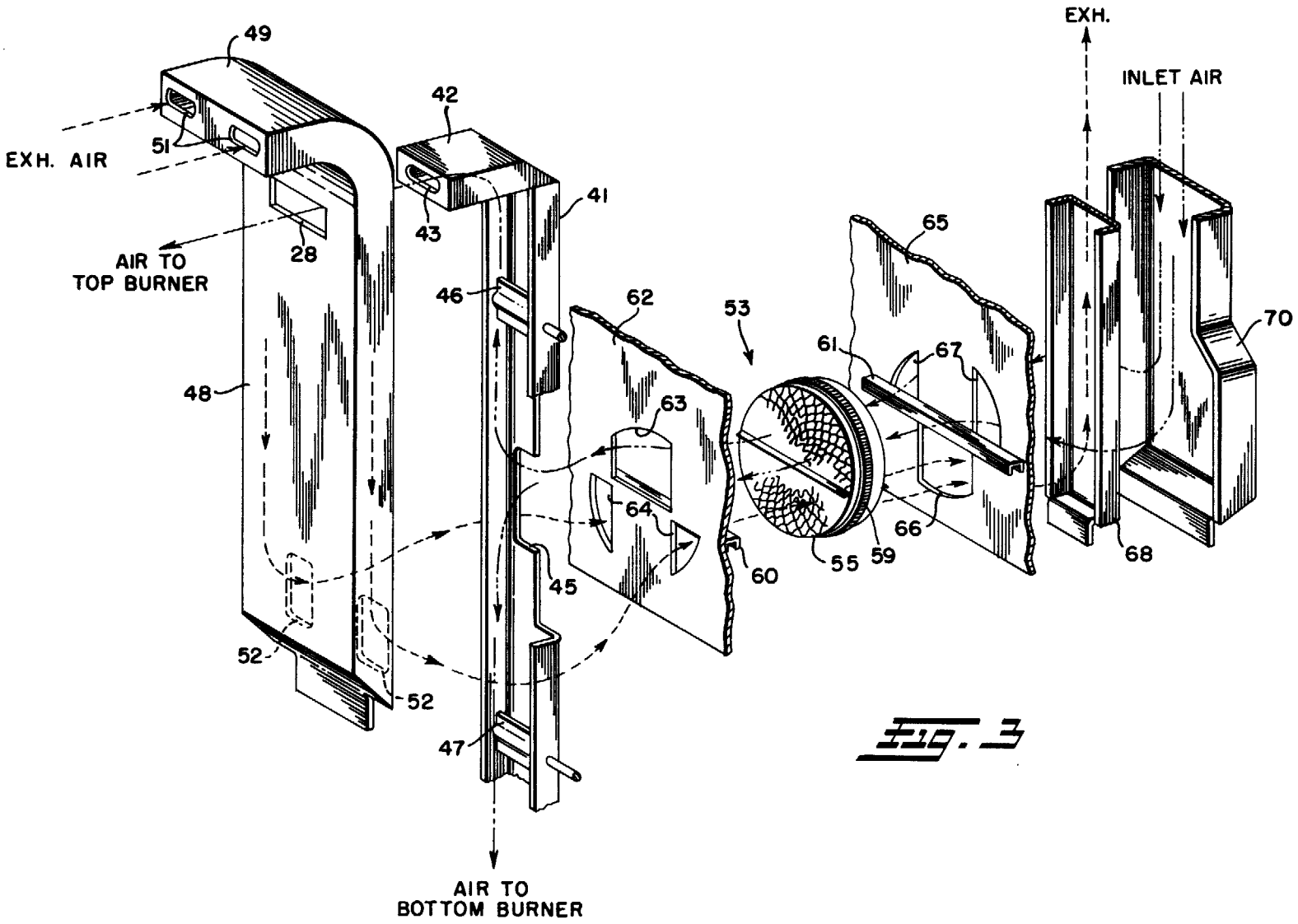
FIG. 3 is an exploded perspective view of a combined air supply and exhaust assembly included in the oven structure.

The air supply duct 41 is in part enclosed by an exhaust manifold 48 which extends generally from about the midpoint on such duct to a point above the top of the latter. This manifold has a forward top extension 49 the end of which is against the rear wall 23 of the top plenum chamber 19, and the abutting sections are formed with registering slots 50, 51 for outflow of flue products from the chamber. The manifold is, as shown most clearly in FIG. 3, wider than the air supply duct, and its rear wall has two bottom outlets 52 respectively at the sides of the duct, so that flue products and the like entering the exhaust manifold can flow downwardly therethrough over the enclosed air supply duct 41 to and from such lower outlets 52.

A heat exchanger designated generally by reference numeral 53 is associated with duct 41 and manifold 48, with this exchanger illustrated as comprising a housing 54 having one end against the duct and manifold in the region of the inlet 45 of the former and outlets 52 of the latter. A regenerator wheel 55 having a multiplicity of axial passages is supported within the housing 54 on rollers 56, with its axis horizontal, and such wheel is rotated relatively slowly by drive means shown as comprising an electric motor 57, a drive gear 58 on the motor shaft, and a toothed ring 59 affixed about the wheel or drum. Channels 60 and 61 are horizontally disposed against the respective ends of the wheel 55 and effectively divide the same into top and bottom halves. A flow plate 62 is provided at the forward end of the housing 54 having an opening 63 in register with the inlet 45 of the air supply duct 41 and with the central section of the top half of the wheel 55. Such plate is also provided with a pair of lower openings 64 respectively in register with the manifold outlets 52 and the bottom half of the wheel at the sections thereof outboard of the central section which corresponds to that in which the top half opening 63 is provided.

A second flow plate 65 is applied to the rear end of the housing 54, and this plate has an opening 66 in register with the central section of the bottom half of the wheel 55 and upper openings 67 registering with the outboard sections at the top half, so that the openings of this second plate are in relatively inverted arrangement as compared to those of the first plate 62.

A vertical exhaust duct 68 extends from the outer or rear flow plate 65 of the heat exchanger, from the bottom half opening 66 in such plate, to remote blower means designated generally by reference numeral 69 and, in the illustrated embodiment, adapted to be housed within the backguard assembly of the environmental kitchen range R. The exhaust duct 68 is enclosed within a large inlet air duct 70 having communication with the top half openings 67 of the rear flow plate 65, with such inlet air duct also extending to the blower means 69 and above the upper end of the vertical exhaust duct 68. Such blower means comprises an electric motor 71 having right and left hand fans 72 and 73 on its drive shaft, with the first fan 72 forcing room or ambient air into the upper end of the inlet duct 70 and the second fan 73 serving to draw flue products and gases from the upper end of the exhaust duct 68 and deliver the same through a discharge section 74 to the room. An air safety switch 75 is shown associated with the air supply fan 72, this switch including a hinged closure 76 for the outlet of this fan which is displaced when the fan is operating to permit the switch to open. Such safety can of course be incorporated in the control system for the oven to insure that the latter cannot be operated unless the fan is supplying the pressurized air to the burner or burners.

It will accordingly be evident that relatively cool ambient air flows downwardly through the inlet duct 70, and hence about the enclosed exhaust duct 68, to the upper half of the slowly rotating regenerator wheel 55 through the flow plate openings 67. Such supply air proceeds through the axial passages of the wheel and the forward flow plate opening 63 to the inlet 45 of the burner air supply duct 41 and, depending upon adjustment of the control dampers 46 and 47, this air under pressure is delivered to either one or both of the burners 25 and 36. The gases and vapors produced in the operation of the oven are drawn about the edges of the top oven baffle 24 into the plenum chamber 19 and proceed from this chamber downwardly through the exhaust manifold 48 and through the outlets 52 thereof and the forward flow plate openings 64 to the bottom half of the rotating drum or wheel 55. These flue products proceed through the bottom half of the wheel, giving up heat thereto, then continue through the rear flow plate opening 66 to the vertical exhaust duct 68 and the suction fan 73.

This regenerator wheel type of heat exchanger is known and may comprise, for example, spirally wrapped corrugated asbestos sheet impregnated with sodium silicate. It will also be apparent that the incoming relatively cool air and the flue products exhaust are in heat exchange relationship in both the manifolding between the regenerator wheel and the oven and in the vertical ducting which extends over substantial distance from the other side of the regenerator wheel. *Such heat exchange structure thus provides multiple surfaces across the opposite sides of which the incoming air and the flue products or gases are caused to flow to recover heat from the latter, for example, the walls of the air supply duct 41 and the wheel 55 immediately at the rear of the oven liner, and the exhaust duct 68 in the continuation of the circulation system.* This heat exchange serves to lower the temperature of the ultimate exhaust to the room to such tolerable level that even the high temperature cleaning cycle can be carried out without the need for venting to the outside of the house. The use of pressurized air to the burners also permits conservation of the secondary air for combustion, whereby the heat output is also relatively diminished on this account. The housing for the concealed bottom burner 36 can be provided if necessary with a plurality of apertures 77 to provide added secondary air in this area.

The controls for the oven have not been shown and will of course be conventional. As is also conventional, the top burner 26 is utilized for broiling and like operations in the normal use of the oven and, for this condition, upper damper 46 in the air supply duct 41 will be fully opened and lower damper 47 fully closed, whereby all of the room air supply is delivered to the top burner. As earlier noted, this burner could be of full radiant type, and it is also possible that the baffle 24 closely above the same could be made of or coated with a readily incandescing material or carry screening to be heated by the flame to add the baffle area as a radiating source.

For baking and roasting in the oven, only the concealed bottom burner 36 will be operative, with the air supply damper 47 full open and damper 46 fully closed. The heated products from the bottom burner of course flow upwardly through wrapper 33 over the exterior surfaces of the oven bottom 14 and enclosed portions of the side walls 11, 12 to and through the apertures 31, 32 respectively at the sides and from the latter to the top plenum chamber 19 for exhaust therefrom in the manner previously described.

It has been determined that the usual food soils which accumulate on the interior surfaces of a cooking oven can be incinerated at a temperature of about 750° F., and the oven herein disclosed is intended also for operation at and above this temperature. Such heat-cleaning cycle is carried out by simultaneous firing of both burners for combined radiant and convective heating effect, with the radiant effect provided by the top burner largely directed beneficially to the smooth bottom of the oven which usually receives most of the drippings and the like which cause the soiling. In such high temperature cleaning cycle, both of the air supply dampers 46 and 47 will preferably be half open for division of the pressurized air substantially equally to the two burners. The oven will be of course suitably insulated and preferably constructed to withstand cavity temperatures on the order of 1000° F.

The circulation of the products of the fully concealed bottom burner through the upper portion of the cooking cavity provides the disclosed single point of collection, in the top plenum chamber, for the exhausting of the cavity, which facilitates the handling of the exhaust and also the preferred heat exchange relationship of the incoming air therewith. The regenerator wheel used in this connection can be replaced by other exchangers of known design and, in some cases, the preheating of the incoming air may not be utilized, for example, where a higher level of exhaust heat might be tolerated. With adequate sealing of the cavity, a single fan at either the supply or exhaust might also serve to provide the desired circulation, but the two fans used as disclosed conveniently provide by adjustment or selection thereof either a negative or positive pressure to be maintained within the cavity as desired. It has, for example, been found that a slight positive pressure can be beneficial in the heat cleaning of the oven door surface, and this condition can readily be realized by using fans of suitable differing capacity. A more sophisticated system might provide variation of the pressure over a range of negative and positive values within a time-controlled operating cycle.

[Other modes of applying the principle of the invention may be employed, change being made as regards the details described, provided the features stated in any of the following claims or the equivalent of such be employed.]

I, therefore, particularly point out and distinctly claim as my invention:

1. A domestic oven comprising a liner forming a cooking cavity having top, bottom, side and rear walls, the bottom walls being substantially smooth and imperforate, broiler burner means mounted in the upper portion of said cavity, with the top wall thereabove having an opening for exhaust of the cavity, bake burner means disposed exteriorly of the cavity, means for delivering combustion air under pressure selectively to either the broiler or bake burner or both, means for circulating the heated products from the bake burner in operation over exterior surfaces of the bottom and side walls, the latter being provided with openings for inflow of such heated products to the cavity and exhaust therefrom through the top wall opening, and means for directing the flue products from such top wall opening to a remote discharge.

2. A domestic oven comprising a liner forming a cooking cavity having top, bottom, side and rear walls, the bottom wall being substantially smooth and imperforate, broiler burner means mounted in the upper portion of said cavity, with the top wall thereabove having an opening for exhaust of the cavity, bake burner means disposed exteriorly of the cavity, means for circulating the heated products from the bake burner in operation over exterior surfaces of the bottom and side walls, the latter being provided with openings for inflow of such heated products to the cavity and exhaust therefrom through the top wall opening, means for directing the flue products from such top wall opening to a remote discharge, and means for delivering ambient air to at least one burner in heat exchange relationship to the flue products withdrawn from the cavity.

3. A domestic oven comprising a liner forming a cooking cavity having top, bottom, side and rear walls, the bottom wall being substantially smooth and imperforate, broiler burner means mounted in the upper portion of said cavity, with the top wall thereabove having an opening for exhaust of the cavity, bake burner means disposed exteriorly of the cavity, means for circulating the heated products from the bake burner in operation over exterior surfaces of the bottom and side walls, the latter being provided with openings for inflow of such heated products to the cavity and exhaust therefrom through the top wall opening, means for directing the flue products from such top wall opening to a remote discharge, and means for delivering ambient air under pressure selectively to one or both of the broiler and bake burners in heat exchange relationship to the flue products exhausted from the cavity.

4. A domestic oven comprising a liner forming a cooking cavity having top, bottom, side and rear walls, the bottom wall being substantially smooth and imperforate, broiler burner means mounted in the upper portion of said cavity, with the top wall thereabove having an opening for exhaust of the cavity, bake burner means disposed exteriorly of the cavity, blower means for causing ambient air to flow to the burners under a pressure differential, flow-regulating means for directing such ambient air flow substantially fully to either the broiler or bake burner, respectively for broiling and baking operations, or dividing the flow between the two burners for joint operation thereof at a relatively high-temperature self-cleaning cycle, means for circulating the heated products from the bake burner in operation over exterior surfaces of the bottom and side walls, the latter being provided with openings for inflow of such heated products to the cavity and exhaust therefrom through the top wall opening, and means for directing the flue products from such top wall opening to a remote discharge.

5. A domestic oven comprising a liner forming a cooking cavity having top, bottom, side and rear walls, the bottom wall being substantially smooth and imperforate, broiler burner means mounted in the upper portion of said cavity, with the top wall thereabove having an opening for exhaust of the cavity, bake burner means disposed exteriorly of the cavity, first fan means for delivering ambient air under pressure to at least one burner, means for circulating the heated products from the bake burner in operation over exterior surfaces of the bottom and side walls, the latter being provided with openings for inflow of such heated products to the cavity and exhaust therefrom through the top wall opening, and second fan means for withdrawing the flue products from the cavity through the top exhaust opening thereof to a remote discharge.

6. An oven as set forth in claim 5, including an electric motor commonly driving the first and second fan means in counter-rotating relation.

7. An oven as set forth in claim 6, including means for bringing the ambient air delivered by the first fan means into heat exchange relationship to the flue products exhausted by the second fan means.

*8. The method of heating the walls of a baking oven for the heat cleaning of soils from the interior wall surfaces of both an oven liner and an access door defining an oven cooking cavity which includes soils accumulated thereupon during the previous carrying out in said oven cavity of normal food cooking operations in the normal food cooking temperature range; said method comprising generating flue gases by a gas burner located in a fire box beneath the bottom of the oven liner, directing the flue gases up around the opposite sides of the oven liner and across the top of the oven liner and then down the back portion of the oven liner, passing the flue gases over a heat exchanger surface and then exhausting the flue gases to the atmosphere, while at the same time passing relatively cool ambient air over the exchanger surface so as to use the heat from the flue gases to heat the ambient air, then supplying the heated air as preheated secondary air for the gas burner, whereby the heat recovered from the flue gases lowers the exhaust temperature of the flue gases to the temperature range between about 300° F. and 550° F. and also increases the efficiency of combustion of the gas burner, so as to reduce the consumption of fuel and hence the amount of the exhaust gases and the total heat in the exhaust gases.*

*9. A self-cleaning gas cooking oven comprising an oven body supporting a box-like oven lineer and a front-opening access door which define an oven cooking cavity, a fire box disposed beneath the bottom wall of the oven liner, a gas burner located within the fire box, heating channels extending up to the opposite side walls back across the top wall and down the rear wall of the oven liner and communicating with the fire box so that convection currents of flue gases from the burner may pass through the channels thereby heating the walls forming the oven cooking cavity, a vertically arranged stationary heat exchanger located adjacent at least one of the heating channels, a flue gas inlet at the bottom of the heat exchanger, and a flue gas outlet at the top of the heat exchanger, an ambient air inlet at the top of the heat exchanger and an ambient air outlet at the bottom of the heat exchanger, said ambient air outlet supplying heated air to the fire box as pre-heated secondary air for the burner, whereby the flue gases flowing through the heat exchanger give up much of their heat to the ambient air.*

* * * * *